Patented Nov. 30, 1937

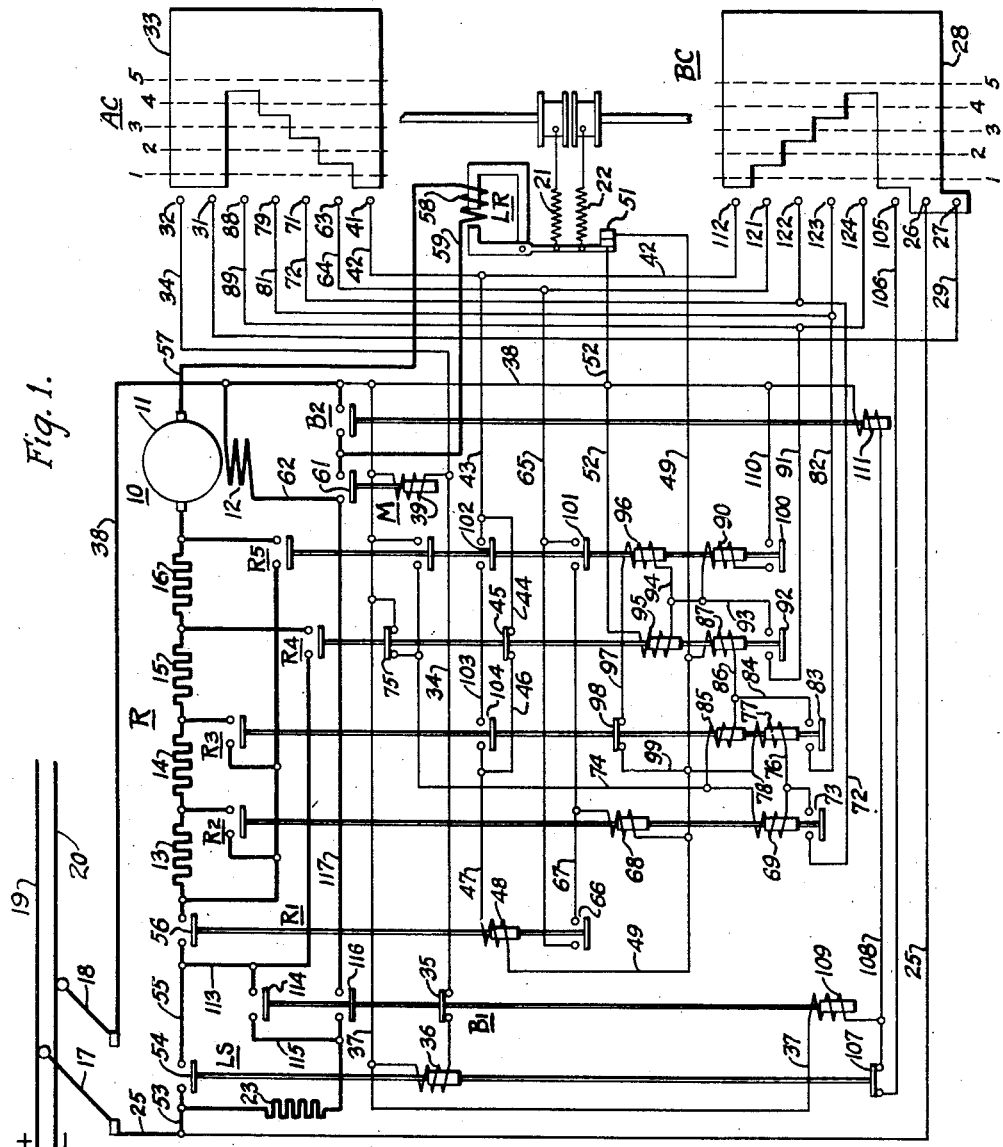

2,100,728

UNITED STATES PATENT OFFICE 2,100,728

MOTOR CONTROL SYSTEM

Norman H. Willby, Irwin, Pa., assignor to Westinghouse Electric & Manufacturing Company, East Pittsburgh, Pa., a corporation of Pennsylvania Application February 5, 1937, Serial No. 124,263

7 Claims. (Cl. 172—179)

My invention relates, generally, to motor control systems and, more particularly, to systems for controlling both the acceleration and the deceleration of the propelling motors of electric vehicles as, for example, trolley buses.

In some cases, it is desirable to so equip electrically-propelled vehicles, particularly trolley buses which are required to operate over excessive grades or make frequent stops, that the driving motors may be utilized to brake the vehicles as well as to propel them. However, it is desirable to keep the size and weight of the control equipment on a trolley bus at a minimum in order that the maximum amount of space will be available for the passengers and that good performance will be obtained without using an excessive amount of power. Furthermore, it is necessary that a trolley bus be capable of accelerating and decelerating rapidly and smoothly in order to cope with modern traffic conditions and to prevent discomfort to the passengers.

An object of my invention, generally stated, is to provide a control system for an electrically propelled vehicle which shall be simple and efficient in operation and which may be economically manufactured and installed.

A more specific object of my invention is to provide for accelerating and decelerating an electrically propelled vehicle both rapidly and smoothly.

Another object of my invention is to provide for increasing the number of control steps or notches both during the acceleration and the deceleration of an electrically propelled vehicle without materially increasing the amount of control equipment.

Other objects of my invention will be explained fully hereinafter or will be apparent to those skilled in the art.

In accordance with one embodiment of my invention, the resistors which control the motor current both during the acceleration and dynamic braking of a vehicle and the switches which shunt the resistors from the motor circuit are so combined and operated that the number of accelerating and braking steps is increased without increasing the number of switches required. The resistor shunting switches are operated by interlock progression both during acceleration and dynamic braking under the control of a current limit relay, the setting of which may be varied by either the acceleration controller or the braking controller.

For a fuller understanding of the nature and objects of my invention, reference may be had to the following detailed description, taken in conjunction with the accompanying drawing, in which:

Figure 1 is a diagrammatic view of a control system embodying my invention; and

Fig. 2 is a chart showing the sequence of operation of a portion of the apparatus illustrated in Fig. 1.

Referring to the drawing, the system shown therein comprises a motor 10 having an armature winding 11 and a series field winding 12, a line switch LS and a switch M for connecting the motor to a power source, a resistor R which is sub-divided into a plurality of sections 13 to 16, inclusive, for controlling the armature current during both the acceleration and deceleration of the motor 10, a plurality of switches R1, R2, R3, R4 and R5 for controlling the resistor connections, switches B1 and B2 for establishing dynamic braking connections for the motor, a limit relay LR for automatically controlling the acceleration and the deceleration of the motor, an accelerating controller AC and a braking controller BC, both of which may be of the drum type.

The motor 10 may be of a type suitable for propelling an electric vehicle, as, for example, a trolley bus (not shown). Power for operating the motor to accelerate the vehicle may be supplied from any suitable source through current collecting devices 17 and 18 which are disposed to engage overhead conductors 19 and 20, respectively.

In order to increase the smoothness of operation of the vehicle during both the accelerating and the decelerating periods of operation the resistor shunting switches are so disposed that they may be operated first in one sequence to shunt a portion of the resistor R from the motor circuit step by step, and then operated in a different sequence to recombine certain sections of the resistor R in the motor circuit and then shunt the resistors from the circuit, thereby increasing the number of control steps or notches provided with a certain number of resistor shunting switches. In this manner, a large number of steps are obtained both during acceleration and dynamic braking without materially increasing the control equipment which provides smoother operation of the vehicle and keeps the space required for the equipment and its weight and cost at a minimum.

With a view to further simplifying the equipment and wiring necessary for controlling the operation of the vehicle both during acceleration and dynamic braking, certain ones of the resistor shunting switches are provided with a closing coil for operating the switch and a holding coil for retaining the switch in the closed position, and the sequence of operation of the switches is controlled by interlocks on the switches instead of by the usual sequence drum. Furthermore, a single interlock on each switch performs the dual function of establishing an energizing circuit for the holding coil of that switch and also the closing coil of the next successive switch, which reduces the number of interlocks required in the system and simplifies the wiring of the equipment.

The rates of acceleration and dynamic braking are both governed by the limit relay LR which is responsive to the motor armature current. The rate of acceleration may be varied within predetermined limits by means of the accelerating controller AC which is connected to a calibrating spring 21 on the limit relay. It will be seen that, as the controller drum is advanced, the tension on the spring 21 is increased, thereby increasing the current required to operate the relay and increasing the rate of acceleration of the motor 10. Likewise, the dynamic braking current and, therefore, the rate of deceleration may be varied by adjusting the tension on a similar calibrating spring 22 by means of the braking controller BC.

Provision is made for energizing the field winding 12 of the motor 10 from the external power source during dynamic braking, thereby insuring that the braking current will build up rapidly and the braking action take effect quickly when the dynamic braking connections are established. A resistor 23 is connected in the field winding circuit to limit the field current to a desired value.

In order that the functioning of the foregoing apparatus may be more clearly understood, the operation of the system will now be described in more detail. Assuming that it is desired to accelerate the vehicle at the maximum rate, the controller AC is fully advanced, thereby closing the switches LS, M and R1 to connect the motor 10 to the external power source. The energizing circuit for the actuating coil of the switch LS may be traced from the positive power conductor 19 through the current collector 17, conductor 25, contact fingers 26 and 27 bridged by a contact segment 28 on the controller BC, conductor 29, contact fingers 31 and 32 bridged by a segment 33 on the controller AC, conductor 34, an interlock 35 on the switch B1, the actuating coil 36 of the switch LS, conductors 37 and 38 and the current collector 18 to the negative power conductor 20. The energizing circuit for the actuating coil of the switch M extends from the previously energized conductor 34 through the actuating coil 39 and conductors 37 and 38 to the negative current collector 18.

The energizing circuit for the actuating coil of the switch R1 may be traced from a contact finger 41 which engages the segment 33 of the controller AC, through conductors 42, 43 and 44, an interlock 45 on the switch R4, conductors 46 and 47, the actuating coil 48 of the switch R1, conductor 49, contact members 51 of the relay LR, and conductors 52 and 38 to the negative current collector 18.

The closing of the switches LS, M and R1 establishes a motor circuit which may be traced from the positive current collector 17 through conductors 25 and 53, contact members 54 on the switch LS, conductor 55, contact members 56 on the switch R1, the resistors 13, 14, 15 and 16, the armature winding 11, conductor 57, the actuating coil 58 of the relay LR, conductor 59, contact member 61 of the switch M, conductor 62, the field winding 12 and conductor 38 to the negative current collector 18.

In this manner, power is applied to the motor 10 to start the vehicle. Since it has been assumed that the controller AC is fully advanced to provide automatic acceleration, the switch R2 will be closed as soon as the motor current decreases to a value which will permit the contact members 51 of the relay LR to close. The energizing circuit for the closing coil of the switch R2 may be traced from a contact finger 63 which engages the segment 33 of the controller AC, through conductors 64 and 65, an interlock 66 on the switch R1, conductor 67, the actuating coil 68, conductor 49, the contact members 51 of the relay R and conductor 52 to the negative conductor 38.

The switch R2 is retained in its closed position by a holding coil 69, which is energized through a circuit extending from a contact finger 71 on the controller AC through conductor 72, an interlock 73 on the switch R2, the holding coil 69, conductor 74, an interlock 75 on the switch R4 and conductors 37 and 38 to the negative current collector 18.

As explained hereinbefore, the interlock 73 on the switch R2 also establishes a circuit to the closing coil of the switch R3. Therefore, this switch will be closed to accelerate the motor still further as soon as the counter-electromotive force of the motor reduces the armature current sufficiently to permit the limit relay LR to close its contact members. The energizing circuit for the closing coil of the switch R3 may be traced from the previously energized conductor 72 through the interlock 73 on the switch R2, conductor 76, the closing coil 77, conductors 78 and 49, the contact members 51 of the relay LR and conductors 52 and 38 to the negative current collector 18.

Likewise, the closing of the switch R3 establishes a circuit for its holding coil and also for the closing coil of the switch R4. The holding circuit may be traced from a contact finger 79 on the controller AC through conductors 81 and 82, an interlock 83 on the switch R3, conductor 84, the holding coil 85 on the switch R3, conductor 74, the interlock 75 on the switch R4, and conductors 37 and 38 to the negative current collector 18.

The energizing circuit for the closing coil of the switch R4 extends from the previously energized conductor 82 through the interlock 83 on the switch R3, conductors 84 and 86, the closing coil 87, conductor 49, the contact members 51 of the relay LR and conductors 52 and 38 to the negative current collector 18. The holding coil for the switch R4 is energized through a circuit which may be traced from a contact finger 88 on the controller AC through conductors 89 and 91, an interlock 92 on the switch R4, conductors 93 and 94, the holding coil 95 and conductors 52 and 38 to the negative current collector 18.

It will be noted that the closing of the switch R4 interrupts the circuit for the actuating coil of the switch R1 and also the circuits through the holding coils of the switches R2 and R3, thereby permitting these switches to be opened at this time since the interlocks 45 and 75 carried by the switch are opened when the main contact members of the switch are closed.

However, the opening of the switch R3 establishes an energizing circuit to the closing coil of the switch R5 which causes this switch to be closed as soon as the contact members of the relay LR are closed. The energizing circuit for the closing coil of the switch R5 may be traced from the previously energized conductor 91 through the interlock 92 on the switch R4, conductors 93 and 94, the closing coil 96, conductor 97, an interlock 98 on the switch R3, conductors 99 and 49, the contact members 51 of the relay LR and conductors 52 and 38 to the negative current collector 18. The holding coil of the switch R5 is energized through a circuit which extends from the previously energized conductor 93 through the coil 90, an interlock 100 on the switch R5, conductors 110 and 38 to the negative current collector 18.

It will be seen that the closing of the switches R4 and R5 and the opening of the switches R1, R2 and R3 connects the resistor section 16 in the motor circuit in parallel circuit relation with the series connected resistors 13, 14 and 15, thereby further decreasing the total resistance in the motor circuit. Following the closing of the switch R5 to establish the parallel connections just described, the switch R2 is reclosed to shunt the resistor 13 from the motor circuit. The energizing circuit for the closing coil of the switch R2 may be traced from the previously energized conductor 65, through an interlock 101 on the switch R5, and conductor 67 to the closing coil 68, thence through conductor 49, the contact members 51 of the relay LR and conductors 52 and 38 to the negative current collector 18.

The switch R3 is then operated under the control of the limit relay LR as previously described, thereby further reducing the total resistance in the motor circuit. Following the closing of the switch R3 the switch R1 is again closed to shunt the remainder of the resistor R from the motor circuit and connect the motor 10 directly across the power conductors. The energizing circuit for the closing coil of the switch R1 extends at this time from the previously energized conductor 43 through an interlock 102 on the switch R5, conductor 103, an interlock 104 on the switch R3, conductor 47, the actuating coil 48 of the switch R1, and thence through the conductor 49 and the contact members 51 of the relay LR and conductors 52 and 38 to the negative current collector 18.

In this manner a portion of the resistor shunting switches is used the second time during the accelerating period to shunt resistance from the motor circuit. However, the sequence of operation is different during the second operation than it was during the first, thereby increasing the number of accelerating steps and improving the performance of the vehicle without increasing the total number of switches required.

In the event that it is desired to decelerate the vehicle by means of dynamic braking, the controller AC is actuated to the off position and the controller BC advanced, thereby causing the switches LS and M to be opened and the switches B1 and B2 to be closed to establish the dynamic braking circuits. The energizing circuit for the actuating coil of the switch B1 may be traced from a contact finger 105, which engages the segment 28 of the controller BC, through conductor 106, an interlock 107 on the switch LS, conductor 108, the actuating coil 109 of the switch B1, and conductors 37 and 38 to the negative current conductor 18. The energizing circuit for the actuating coil of the switch B2 extends from the conductor 108 through the coil 111 and conductor 38 to negative current collector 18.

At this time, the switch R1 is also closed, the actuating coil of the switch being energized through a circuit which extends from a contact finger 112 on the controller BC through conductors 42, 43 and 44, an interlock 45 on the switch R4, conductors 46 and 47, the coil 48, conductor 49, the contact members 51 of the relay LR, and conductors 52 and 38 to the negative current collector 18.

The closing of the switches B1, B2 and R1 establishes a dynamic braking circuit for the armature of the motor 10, which may be traced from one terminal of the armature 11 through resistors 16, 15, 14 and 13, the contact members 56 of the switch R1, conductor 113, contact members 114 of the switch B1, conductor 115, contact members 116 of the switch B1, conductors 117 and 62, the field winding 12, conductor 38, the switch B2, conductor 59, the coil 58 of the relay LR and conductor 57 to the other terminal of the armature 11.

As explained hereinbefore, the field winding 12 of the motor 10 is energized from the power source during dynamic braking to insure that the motor current will build up rapidly to cause braking action to take effect quickly. The energizing circuit for the field winding 12 may be traced from the positive current collector 17 through conductors 25 and 53, the resistor 23, contact members 116 of the switch B1, conductors 117 and 62, field winding 12 and conductor 38 to the negative current collector 18.

As shown in the sequence chart in Fig. 2, the switches R2, R3, R4 and R5 are operated in the same manner as during acceleration to shunt the resistor R from the motor circuit, thereby controlling the motor current and regulating the braking effect. Furthermore, the number of braking steps is increased by recombining certain sections of the resistor R during the braking operation, as has been explained in detail in the preceding description of the accelerating cycle. The operation of the resistor shunting switches is controlled by interlock progression in the manner hereinbefore described and the rate of operation is automatically governed by the current limit relay LR in the same manner as during acceleration of the vehicle. The setting of the relay LR and, therefore, the rate of dynamic braking may be varied by increasing the tension on the spring 22 by means of the controller BC, as hereinbefore described.

It will be noted that the controllers AC and BC are both so constructed that the operation of the resistor shunting switches from step to step may be manually controlled in place of automatically controlled, as hereinbefore described. Thus, if the controller BC is held on position 2, in which case a contact finger 121 engages the segment 28, the progression of the resistor shunting switches will be stopped with the switch R2 closed, since the energizing circuits for the remaining switches will not be established through the controller BC. Likewise, it is necessary to actuate the controller BC through positions 3, 4 and 5 to energize the contact fingers 122, 123 and 124 in order to complete the progression of the control through switches R3, R4 and R5, respectively.

The progression of the control may be manually controlled during acceleration, in the same manner, by retaining the controller AC on positions 1, 2, 3, 4 or 5, as desired. In case it is desired to utilize automatic control the controllers are initially advanced through position 5, as hereinbefore described, thereby causing the progression of the switches to be controlled by the limit relay LR.

From the foregoing description it is apparent that I have provided a system for controlling both the acceleration and the deceleration of electrically propelled vehicles which is applicable to trolley buses in which it is desirable to keep the weight of the equipment and the space required for the equipment at a minimum. The system herein described produces rapid and smooth acceleration and deceleration of the vehicle, since a comparatively large number of control steps may be provided with a relatively small amount of control equipment.

Since numerous changes may be made in the above described construction and different embodiments of the invention may be made without departing from the spirit and scope thereof, it is intended that all matter contained in the foregoing description and shown in the accompanying drawing shall be interpreted as illustrative and not in a limiting sense.

I claim as my invention:

1. In a motor control system, in combination, a motor for propelling a vehicle, a source of power for the motor, switching means for connecting the motor to the power source to accelerate the vehicle, switching means for establishing dynamic braking connections for the motor to decelerate the vehicle, a plurality of resistors for controlling the motor current during acceleration and deceleration of the vehicle, a plurality of switches for controlling the resistor connections, control means for initiating the operation of said switches, and interlocking means on said switches for causing them to be operated first in one sequence and then in a different sequence to increase the number of accelerating and decelerating steps.

2. In a motor control system, in combination, a motor for propelling a vehicle, a source of power for the motor, switching means for connecting the motor to the power source to accelerate the vehicle, switching means for establishing dynamic braking connections for the motor to decelerate the vehicle, a plurality of resistors for controlling the motor current during acceleration and deceleration of the vehicle, a plurality of switches for controlling the resistor connections, control means for initiating the operation of said switches, interlocking means on said switches for causing them to be operated first in one sequence and then in a different sequence to increase the number of accelerating and decelerating steps, and a current limit relay responsive to the motor current for governing the operation of said switches.

3. In a motor control system, in combination, a motor for propelling a vehicle, a source of power for the motor, means for connecting the motor to the power source to accelerate the vehicles, means for establishing dynamic braking connections for the motor to decelerate the vehicle, a plurality of resistors for controlling the motor current during acceleration and deceleration of the vehicle, a plurality of switches for controlling the resistor connections, control means for initiating the operation of said switches, and interlocking means on said switches for causing them to be operated first in one sequence and then in a different sequence to increase the number of accelerating and decelerating steps, certain of said switches having a closing coil and a holding coil energized through said interlocking means.

4. In a motor control system, in combination, a motor for propelling a vehicle, a source of power for the motor, means for connecting the motor to the power source to accelerate the vehicles, means for establishing dynamic braking connections for the motor to decelerate the vehicle, a plurality of resistors for controlling the motor current during acceleration and deceleration of the vehicle, a plurality of switches for controlling the resistor connections, control means for initiating the operation of said switches, and interlocking means on said switches for causing them to be operated first in one sequence and then in a different sequence to increase the number of accelerating and decelerating steps, certain of said switches having a closing coil and a holding coil energized through said interlocking means, said closing coil being energized through an interlock on one switch and the holding coil being energized through an interlock on another switch.

5. In a motor control system, in combination, a motor for propelling a vehicle, a source of power for the motor, means for connecting the motor to the power source to accelerate the vehicle, means for establishing dynamic braking connections for the motor to decelerate the vehicle, a plurality of resistors for controlling the motor current during acceleration and deceleration of the vehicle, a plurality of switches for controlling the resistor connections, control means for initiating the operation of said switches, interlocking means associated with said switches and cooperating with said control means for causing the switches to be operated first in one sequence and then in another sequence to increase the number of accelerating and decelerating steps, certain of said switches having a closing coil and a holding coil, and an interlock on each of said switches through which the holding coil of said switch and the closing coil of the next successive switch are energized.

6. In a motor control system, in combination, a motor for propelling a vehicle, a source of power for the motor, means for connecting the motor to the power source to accelerate the vehicle, means for establishing dynamic braking connections for the motor to decelerate the vehicle, a plurality of resistors for controlling the motor current during acceleration and deceleration of the vehicle, a plurality of switches for controlling the resistor connections, control means for initiating the operation of said switches, interlocking means associated with said switches and cooperating with said control means for causing the switches to be operated first in one sequence and then in another sequence to increase the number of accelerating and decelerating steps, certain of said switches having a closing coil and a holding coil, an interlock on each of said switches through which the holding coil of said switch and the closing coil of the next successive switch are energized, and relay means responsive to the motor current and cooperating with said interlocks to control the energization of said closing coils.

7. In a motor control system, in combination, a motor for propelling a vehicle, a source of power for the motor, means for connecting the motor to the power source to accelerate the vehicle, means for establishing dynamic braking connections for the motor to decelerate the vehicle, a plurality of resistors for controlling the motor current during acceleration and deceleration of the vehicle, a plurality of switches for controlling the resistor connections, control means for initiating the operation of said switches, interlocking means on said switches for causing them to be operated first in one sequence and then in a different sequence to increase the number of accelerating and decelerating steps, a relay responsive to the motor current and cooperating with said interlocks to control the operation of said switches, and means actuated by said control means for governing the operation of said relay.

NORMAN H. WILLBY.